United States Patent
Long et al.

(10) Patent No.: US 11,660,709 B2
(45) Date of Patent: May 30, 2023

(54) DEVICE AND METHOD FOR MANUFACTURING COATED WELDING ROD

(71) Applicant: ZHENGZHOU RESEARCH INSTITUTE OF MECHANICAL ENGINEERING CO., LTD., Zhengzhou (CN)

(72) Inventors: Weimin Long, Zhengzhou (CN); Sujuan Zhong, Zhengzhou (CN); Hongwei Dong, Zhengzhou (CN); Lei Zhang, Zhengzhou (CN); Yinyin Pei, Zhengzhou (CN); Guanxing Zhang, Zhengzhou (CN); Yafang Cheng, Zhengzhou (CN); Kun Zhu, Zhengzhou (CN)

( * ) Notice: Subject to any disclaimer, the term of this patent is extended or adjusted under 35 U.S.C. 154(b) by 146 days.

(21) Appl. No.: 16/978,051

(22) PCT Filed: Jun. 8, 2020

(86) PCT No.: PCT/CN2020/094937
§ 371 (c)(1),
(2) Date: Sep. 3, 2020

(87) PCT Pub. No.: WO2021/248277
PCT Pub. Date: Dec. 16, 2021

(65) Prior Publication Data
US 2022/0063025 A1     Mar. 3, 2022

(51) Int. Cl.
*B05C 3/09*     (2006.01)
*B05C 9/14*     (2006.01)
(Continued)

(52) U.S. Cl.
CPC .............. *B23K 35/404* (2013.01); *B05C 3/09* (2013.01); *B05C 9/14* (2013.01); *B05C 11/1039* (2013.01);
(Continued)

(58) Field of Classification Search
USPC .......................... 118/427–429, 500, 503, 308
See application file for complete search history.

(56) References Cited

U.S. PATENT DOCUMENTS 2,154,607 A * 4/1939 Doom ....................... B22F 1/16
                                          148/273
3,765,591 A * 10/1973 Cook ................... B23K 3/0653
                                          228/180.1

FOREIGN PATENT DOCUMENTS

CN         102218622 A     10/2011
CN         102319964 A      1/2012
(Continued)

OTHER PUBLICATIONS

Notification to Grant Patent Right issued in corresponding Chinese App. No. 202080001448.9, dated Mar. 3, 2022, with English translation (5 pages).
Supplemental Search issued in corresponding Chinese App. No. 202080001448.9, English translation (1 page).
(Continued)

*Primary Examiner* — Yewebdar T Tadesse
(74) *Attorney, Agent, or Firm* — Verrill Dana, LLP; Robert L. Hover (57) ABSTRACT

The present disclosure provides a device and method for manufacturing a coated welding rod. The device for manufacturing a coated welding rod includes a grabbing device, a heating device, and a flux storage device. The heating device is configured to heat a welding rod in the grabbing device. A flux in granular form is stored in the flux storage device, the grabbing device is configured to transport the heated welding rod into the flux storage device, and the heated welding rod is configured to heat the flux surrounding
(Continued)

the welding rod into a viscous glassy state so that the flux in the viscous glassy state adheres to the surface of the welding rod. The heated welding rod enables the granular flux to be formed into a viscous glassy state so that the flux can be adhered directly to the surface of the welding rod.

18 Claims, 4 Drawing Sheets

(51) Int. Cl.
*B05C 11/10* (2006.01)
*B23K 35/40* (2006.01)
*B23K 35/365* (2006.01)
*B23P 15/00* (2006.01)
*B05C 13/02* (2006.01)

(52) U.S. Cl.
CPC ............ *B05C 13/02* (2013.01); *B23K 35/365* (2013.01); *B23P 15/00* (2013.01)

(56) References Cited

FOREIGN PATENT DOCUMENTS

| | | | |
|---|---|---|---|
| CN | 106271230 | A | 1/2017 |
| CN | 205994610 | U | 3/2017 |
| CN | 205996410 | U | 3/2017 |
| CN | 208261053 | U | 12/2018 |
| CN | 109483014 | A | 3/2019 |
| CN | 210046239 | U | 2/2020 |
| CN | 111015024 | A | 4/2020 |
| FR | 3011197 | A1 | 4/2015 |
| JP | 5956998 | A | 4/1984 |
| JP | 2007313538 | A | 12/2007 |

OTHER PUBLICATIONS

First Office Action and Search issued in corresponding Chinese App. No. 202080001448.9, dated Sep. 3, 2021, with English translation (13 pages).

International Search Report and Written Opinion issued in corresponding International Application No. PCT/CN2020/094937, dated Mar. 12, 2021 (11 pages).

* cited by examiner

DEVICE AND METHOD FOR MANUFACTURING COATED WELDING ROD

CROSS-REFERENCE TO RELATED APPLICATION

This application is a United States National Stage of International Application No. PCT/CN2020/094937, filed Jun. 8, 2020, the entire contents of which is incorporated in the present application by reference.

TECHNICAL FIELD

The present disclosure relates to the technical field of manufacture of welding rods, and in particular to a device and method for manufacturing a coated welding rod.

BACKGROUND ART

Brazing materials are widely applied in fields such as aerospace, electrical machinery, automobiles, electronic information, and household refrigeration appliances and can be dubbed industrial "universal glue". In the conventional production of coated brazing materials, it is necessary to add an organic binder to a flux to form a viscous paste, which is then applied (coated) to surfaces of welding rods as brazing materials. On the one hand, toxic and hazardous gases are released from the organic binders during the manufacture of and welding use with the coated brazing materials, which will pollute the environment and endanger the health of people. On the other hand, the organic binders are not completely decomposed during welding so that some organic residues remain in the welded joints, which will cause welding defects and severely affect the effectiveness and reliability of the welded joints and the service life of workpieces.

SUMMARY

The present disclosure provides a device and method for manufacturing a coated welding rod so as to alleviate at least one of the technical problems existing during the manufacture of and welding with coated brazing materials in the prior art, in which toxic and hazardous gases polluting the environment are released from organic binders, and the organic binders are not completely decomposed during welding so that some organic residues remain in the welded joints, which will cause welding defects and affect the effectiveness and reliability of the welded joints and the service life of workpieces.

Embodiments of the present disclosure may be implemented as follows:

An embodiment of the present disclosure provides a device for manufacturing a coated welding rod, including: a grabbing device, heating devices, and a flux storage device;

wherein the grabbing device is configured to grab a single welding rod each time, each heating device is located at a grabbing end of the grabbing device, and each heating device is configured to heat the welding rod in the grabbing device;

a flux in granular form is stored in the flux storage device, the grabbing device is configured to transport the heated welding rod into the flux storage device, and the heated welding rod is configured such that a flux surrounding the welding rod is heated to become a viscous glassy state, so that the flux in the viscous glassy state adheres to a surface of the welding rod.

Optionally, the grabbing device includes a driving mechanism, rotating mechanisms, and grabbing mechanisms;

the driving mechanism is in drive connection with the rotating mechanisms, the driving mechanism is configured to drive the rotating mechanisms to rotate with the driving mechanism being a center of the rotation, each rotating mechanism is connected with the respective grabbing mechanism at its end away from the driving mechanism, and each grabbing mechanism is configured to grab the respective welding rod.

Optionally, the device for manufacturing a coated welding rod further includes a first transport device and a second transport device;

wherein the first transport device and the second transport device are arranged symmetrically with respect to the driving mechanism in a horizontal direction, the flux storage device is located below the driving mechanism, and the driving mechanism is configured to drive the rotating mechanisms to rotate in a direction from the first transport device to the second transport device so that the grabbing end of the grabbing mechanism is immersed into the flux storage device.

Optionally, the rotating mechanism includes a rotating rod; one end of the rotating rod is in drive connection with the driving mechanism, the other end of the rotating rod is connected with the respective grabbing mechanism, and the rotating rod has a length equal to a distance between the driving mechanism and the first transport device and is configured to enable the driving mechanism to grab an initial welding rod on the first transport device by using the grabbing mechanism.

Optionally, a plurality of rotating rods are provided, the plurality of rotating rods are arranged evenly along a circumferential direction of the driving mechanism, and each of the rotating rods is in drive connection with the driving mechanism.

Optionally, the first transport device includes a first conveyor belt, and the second transport device includes a second conveyor belt;

a plurality of first placement parts configured to allow initial welding rods to be placed therein or thereon are arranged at equal intervals in or on the first conveyor belt, and a plurality of second placement parts configured to allow the coated welding rods to be placed therein or thereon are arranged at equal intervals in or on the second conveyor belt.

Optionally, the device for manufacturing a coated welding rod further includes a flux recovery mechanism;

the flux recovery mechanism is located below the second conveyor belt and is configured to recover the flux dropped from the coated welding rod.

Optionally, the device for manufacturing a coated welding rod further includes a vibrating mechanism;

the vibrating mechanism is located on the second conveyor belt, the vibrating mechanism is connected with the second conveyor belt, and the vibrating mechanism is configured to clean a coated welding rod placed on the second conveyor belt by vibration and is configured such that the flux not which is adhered to the coated welding rod is vibrated down into the flux recovery mechanism.

Optionally, each heating device includes an electrode tip and a power source;

the electrode tip is located in the grabbing mechanism, the electrode tip is electrically connected with the power source, wherein the power source is configured to power the heating of the electrode tip.

Optionally, each grabbing mechanism includes a first driving part, a second driving part, and also includes a first curved segment and a second curved segment which are arranged symmetrically;

the first curved segment and the second curved segment are hinged to the rotating mechanism, respectively, the first driving part is in drive connection with the first curved segment, the second driving part is in drive connection with the second curved segment, and the first driving part and the second driving part are configured to respectively drive the first curved segment and the second curved segment to move in directions toward or away from each other so that the welding rod is grabbed in or released from a clamping channel formed between the first curved segment and the second curved segment.

Optionally, the device for manufacturing a coated welding rod further includes a control device, temperature detection devices, a first speed detection device, a second speed detection device, and a third speed detection device;

the control device is in electrical signal connection with the temperature detection devices, the first speed detection device, the second speed detection device, and the third speed detection device respectively, each temperature detection device is disposed on the respective heating device and configured to detect information on a temperature of the heating device and transmit this temperature information to the control device, and the control device in which a threshold range is preset is configured to correspondingly control the heating power of heating by the heating device;

the first speed detection device is configured to detect first transport speed information on the first transport device, the second speed detection device is configured to detect second transport speed information on the second transport device, the third speed detection device is configured to detect third rotation speed information on the rotating mechanism, and the control device is configured to receive the first transport speed information, the second transport speed information, and the third rotation speed information and correspondingly control the running speeds of the first transport device, the second transport device and the driving mechanism to be matched one another.

Optionally, the device for manufacturing a coated welding rod further includes angle detection devices;

wherein each angle detection device is disposed on the respective rotating mechanism, the angle detection device is configured to detect rotation angle information on the rotating mechanism and transmit this angle information to the control device, and the control device is configured to correspondingly control ON or OFF of the respective heating device based on the rotation angle information and is configured to stop the heating of the welding rod to which the flux is already adhered.

The present disclosure provides a method for manufacturing a coated welding rod described above, including the steps of:

producing an initial welding rod as a brazing material;

heating the initial welding rod, and heating a granular flux to coat the surface of the initial welding rod with the granular flux; and finishing a coated welding rod.

Optionally, the step of producing an initial welding rod as a brazing material further includes the steps of:

casting an ingot using raw materials with prepared compositions;

heating the ingot and then extruding the ingot into a wire;

drawing the extruded wire to have a target diameter;

straightening the welding rod that reaches the target diameter; and cutting the straightened welding rod at a preset size to finish the initial welding rods.

Optionally, the step of heating the initial welding rod further includes the steps of:

placing on a first transport device the initial welding rods which are cut into a fixed length and sorting them so that they are arranged individually at equal intervals;

a grabbing device sequentially grabbing and fixing each individual initial welding rod from the first transport device; and heating the initial welding rod fixed in the grabbing device;

wherein the initial welding rod is heated at a temperature ranging from 200° C. to 400° C.

Optionally, the step of heating a granular flux to coat a surface of the initial welding rod with the granular flux further includes the steps of:

grinding a flux which is mixed according to a specified formula, into granular form;

placing the granular flux in a flux storage device and placing the flux storage device below the grabbing device;

the grabbing device driving the heated initial welding rod to rotate so that the heated initial welding rod is moved into the flux storage device;

wherein the outer surface of the heated initial welding rod is surrounded by the granular flux, and the flux surrounding the welding rod is melted into a viscous glassy state and adheres to the surface of the welding rod so that a coated welding rod is formed.

Optionally, the method for manufacturing a coated welding rod further includes the steps of:

the grabbing device driving the coated welding rod to which the flux is already adhered to rotate so that the coated welding rod is moved out of the flux storage device; and stopping heating the coated welding rod to which the flux is already adhered, wherein the flux in the glassy state is cooled down together with the coated welding rod.

Optionally, the method for manufacturing a coated welding rod further includes the steps of:

the grabbing device driving the cooled coated welding rod to rotate onto a second transport device; and a vibrating mechanism on the second transport device vibrating the flux with low adhesion or the unmelted and unadhered flux, which is the made to be off the periphery of the coated welding rod and reach a flux recovery mechanism.

Optionally, the method for manufacturing a coated welding rod further includes the steps of:

detecting the coated welding rods which are already subjected to vibrations; and collecting and packaging the coated welding rods which are already detected.

Optionally, the method for manufacturing a coated welding rod further includes the steps of:

a control device controlling a transport speed of the first transport device, a transport speed of the second transport device, and a rotation speed of the grabbing device to make them matched with one another, with the control device in electrical signal connection with each of the first transport device, the second transport device, the grabbing device and the heating device correspondingly; and the control device correspondingly controlling a rotation angle of the grabbing device to be matched with an interval between ON and OFF of the heating devices.

The present disclosure brings about at least the following advantageous effects. The present disclosure provides a device for manufacturing a coated welding rod, including: a grabbing device, a heating device, and a flux storage device. The grabbing device is configured to grab welding rods one by one, the heating device is located at a grabbing end of the grabbing device, and the heating device is configured to heat the welding rod in the grabbing device. A flux in granular form is stored in the flux storage device, the grabbing device is configured to transport the heated welding rod into the flux storage device, and the heated welding rod is configured to heat the flux surrounding the welding rod into a viscous glassy state so that the flux in the viscous glassy state adheres to the surface of the welding rod. A welding rod is heated by using the heating device, and the heated welding rod enables a granular flux to be turned into a viscous glassy state, so that the flux can be adhered directly to the surface of the welding rod. The whole process is implemented without use of organic binder so that pollutions to environment are reduced. Thus, the present disclosure can alleviate at least one of the technical problems existing during the manufacture of and welding with coated brazing materials in the prior art, in which toxic and hazardous gases polluting the environment are released from organic binders, and the organic binders are not completely decomposed during welding so that some organic residues remain in the welded joints, which will cause welding defects and affect the effectiveness and reliability of the welded joints and the service life of workpieces.

BRIEF DESCRIPTION OF DRAWINGS

In order to more clearly illustrate technical solutions of embodiments of the present disclosure, drawings required for use in the embodiments will be described briefly below. It is to be understood that the drawings below are merely illustrative of some embodiments of the present disclosure, and therefore should not be considered as limitations on its scope. It will be understood by those of ordinary skill in the art that other relevant drawings can also be obtained from these drawings without any inventive effort.

REFERENCE NUMERALS

100—coated welding rod; 200—initial welding rod; 300—grabbing device; 301—driving mechanism; 302—rotating mechanism; 303—grabbing mechanism; 313—first driving part; 323—second driving part; 333—first curved segment; 343—second curved segment; 400—heating device; 500—flux storage device; 600—first transport device; 700—second transport device; 800—flux recovery mechanism; 900—vibrating mechanism.

DETAILED DESCRIPTION OF EMBODIMENTS

In order to further clarify the objects, technical solutions, and advantages of the embodiments of the present disclosure, the technical solutions of the embodiments of the present disclosure will be described below clearly and completely with reference to the drawings of the embodiments of the present disclosure. It is apparent that the embodiments to be described are some, rather than all of the embodiments of the present disclosure. Generally, the components of the embodiments of the present disclosure, as described and illustrated in the figures herein, may be arranged and designed in a wide variety of different configurations.

Thus, the following detailed description of the embodiments of the present disclosure, as represented in the figures, is not intended to limit the scope of the present disclosure as claimed, but is merely representative of selected embodiments of the present disclosure. All the other embodiments obtained by those of ordinary skill in the art in light of the embodiments of the present disclosure without inventive efforts shall fall within the scope of the present disclosure as claimed.

It should be noted that similar reference numerals and letters refer to similar items in the following figures, and thus once an item is defined in one figure, it is not needed be further defined or explained in the following figures.

In the description of the present disclosure, it should be noted that orientation or positional relations indicated by the terms such as "inside (or inner)" and "outside (or outer)" are the orientation or positional relations shown based on the figures, or the orientation or positional relations in which the inventive product is conventionally placed in use, and these terms are intended only to facilitate the description of the present disclosure and simplify the description, but not intended to indicate or imply that the referred devices or elements must be in a particular orientation or constructed or operated in the particular orientation, and therefore should not be construed as limiting the present disclosure.

In the description of the present disclosure, it should also be noted that the terms "disposed" and "connected" should be understood broadly unless otherwise expressly specified or defined. For example, a connection may be fixed connection or detachable connection or integral connection, may be mechanical connection or electric connection, or may be direct coupling or indirect coupling via an intermediate medium or internal communication between two elements. The specific meanings of the above-mentioned terms in the present disclosure can be understood by those of ordinary skill in the art according to specific situations.

It should be noted that it is necessary to separately add a brazing material and a flux (brazing flux) to a coating for welding rods in the welding process. The procedure of addition into the coating involves problems such as complicated processes and operations, high dependence on experience, and high residue of flux after welding, which will affect the stability of the brazing connection and the reliability of workpieces in use. Here, a coated brazing material is formed by wrapping a flux around a brazing material, thus the brazing material and the flux can be synergistically added, the amounts of the brazing material and the flux used are greatly reduced, thereby the conventional brazing processes and methods are improved. Therefore, the coated brazing material is a rare good product manufactured eco-friendly due to a series of advantages, such as convenient operation, high brazing efficiency, stable welding quality, and reliable welded joints. However, the most important step during the production of the coated brazing material is the coating of the flux. In the conventional production of the coated brazing material, it is required to add an organic binder to a flux to form a viscous paste, which is then applied to the surface of a welding rod as a brazing material. Due to the use of organic binders, on the one hand, organic chemicals in the organic binders will give off a pungent smell, which will affect the life safety and health of production personnel. Also, it is extremely difficult to clean and eliminate the organic chemicals, which causes severe pollution to water and soil. On the other hand, during the use of the coated welding rods 100 with organic binders, toxic and hazardous gases are released from organic chemicals which are in a high-temperature state, and the organic matters are carbonized and turned into black smoke which is released into the air, which will cause pollution to the environment. Moreover, organic chemical residues remain in the welded joints, which will cause welding defects and severely affect the effectiveness, reliability and durable service life of the welded joints. The residual organic matters adversely affecting the welded joints have to be cleaned by more procedures, which will severely affect the production efficiency and product quality of the related enterprises.

As shown in FIGS. 1 to 5, an embodiment of the present disclosure provides a device for manufacturing a coated welding rod, including: a grabbing device 300, heating devices 400, and a flux storage device 500. The grabbing device 300 is configured to grab a single welding rod (one by one), each heating device 400 is located at a grabbing end of the grabbing device 300, and the heating device 400 is configured to heat the welding rod in the grabbing device 300. A flux in granular form is stored in the flux storage device 500, the grabbing device 300 is configured to transport the heated welding rod into the flux storage device 500, and the heated welding rod is configured to heat the flux surrounding the welding rod into a viscous (thick) and glassy state so that the flux in the viscous and glassy state adheres to the surface of the welding rod.

Figure 1:
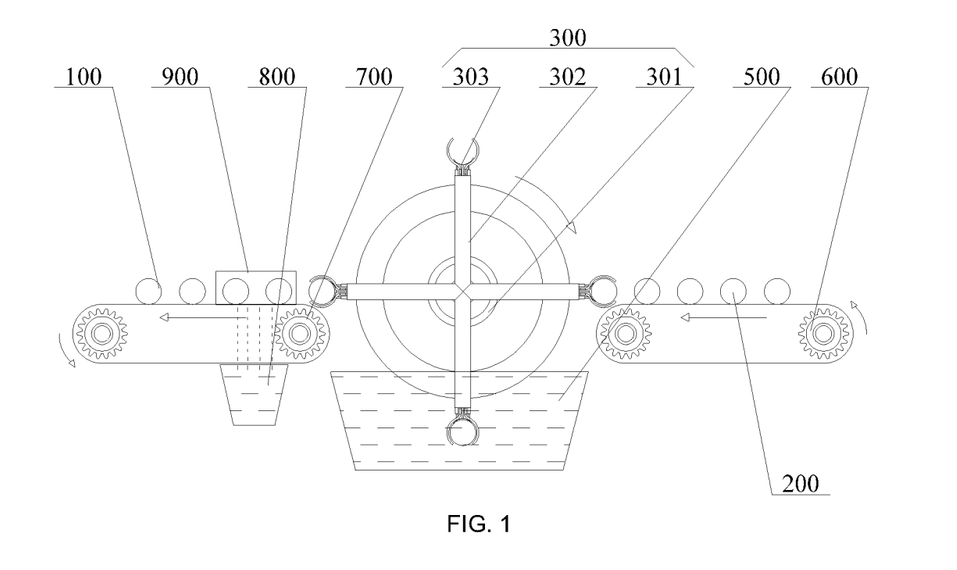
FIG. 1 is a schematic overall structural diagram of a device for manufacturing a coated welding rod according to an embodiment of the present disclosure.
Figure 2:
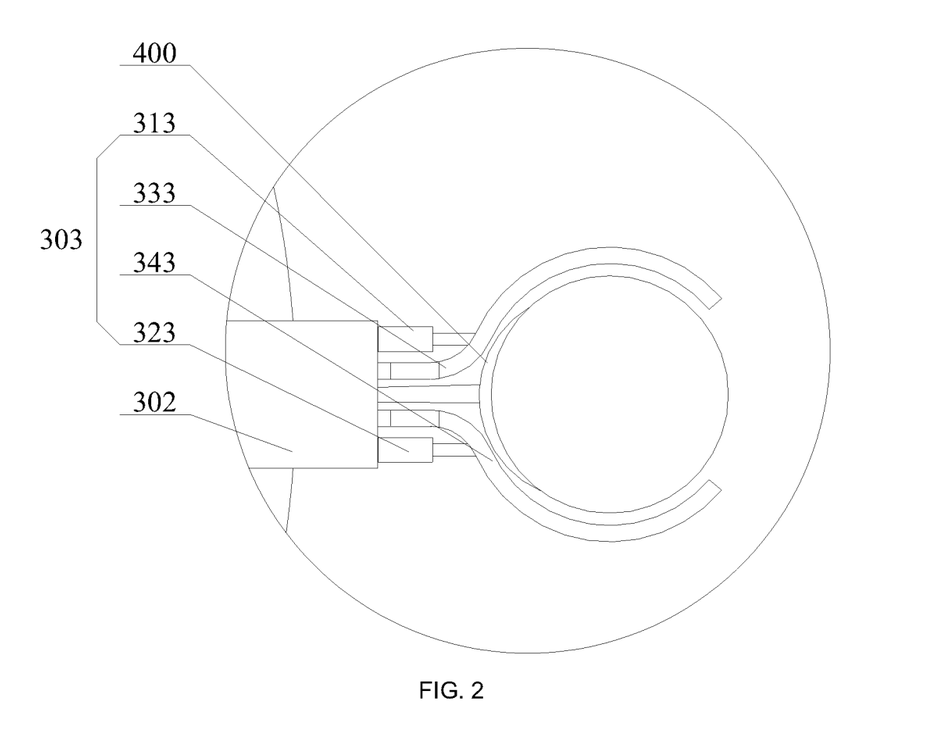
FIG. 2 is a schematic partially enlarged structural diagram of a device for manufacturing a coated welding rod according to an embodiment of the present disclosure.
Figure 3:
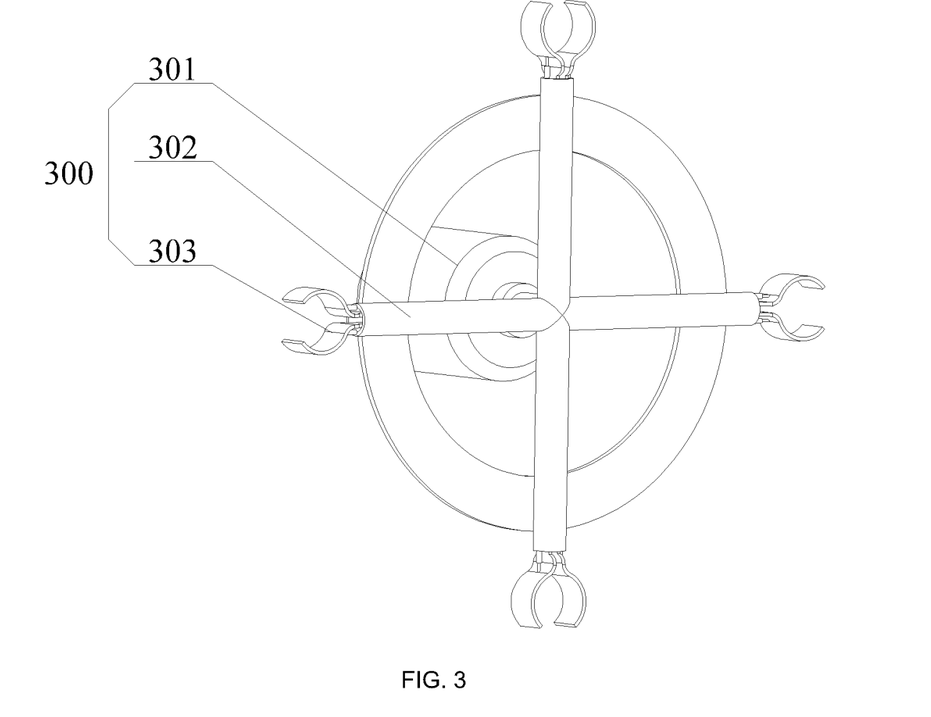
FIG. 3 is a schematic structural diagram of a grabbing device of a device for manufacturing a coated welding rod according to an embodiment of the present disclosure.

Optionally, the grabbing device 300 may be in a variety of structures. For example, a multi-axis robotic arm may be used directly as the grabbing device 300. A single initial welding rod 200 is grabbed, fixed, and moved into the flux storage device 500 by using the flexible motions and grabbing functions of the robotic arm. Optionally, the grabbing device 300 may be in a turntable structure, wherein the end of the turntable structure is provided with a grabbing end which can be used to grab and fix a single initial welding rod 200, and the turntable can drive the grabbing end and the initial welding rod 200 to move into the flux storage device 500. Further, each heating device 400 may be located at the grabbing end of the robotic arm and can heat the initial welding rod 200. After the initial welding rod 200 is heated to a predetermined temperature, the initial welding rod 200 can heat the granular flux in the flux storage device 500 to a viscous glassy state. The flux undergoes a physical change while being heated. The viscosity of the flux in the viscous glassy state allows the flux to adhere to the outer surface of the welding rod. Further, the coated welding rod 100 to which the flux has adhered is taken out of the flux storage device 500 by the grabbing device 300 and then cooled down until it is completely cooled. At this time, the manufacture of the coated welding rod 100 is completed.

Optionally, each heating device 400 is configured to heat the initial welding rod 200 at a temperature ranging from 200° C. to 400° C., wherein the initial welding rod 200 should be heated at a temperature higher than a temperature at which the flux is melted into a glassy state, preferably by a temperature which is 30° C.-50° C. higher than the above temperature range, depending on different melting temperatures of granular fluxes having different components.

In addition, it should be noted that activation temperatures of different fluxes are generally between 650° C. and 1000° C., therefore the initial welding rod 200 heated to 200° C. to 400° C. causes only a physical change to the flux so that the flux is turned into a viscous glassy state, while the high-temperature activity of the flux will not be affected.

Optionally, each heating device 400 may be in a heating structure of an electrode tip, or may be a structure such as an electric heating wire.

Optionally, a flux storage barrel or a flux storage tank or the like may be used as the flux storage device 500, as long as it can ensure accommodation of the granular flux and has an opening at one end from which the grabbing end of the grabbing device 300 can extend into the flux storage device 500. Details thereof will not be described here.

The present disclosure brings about at least the following advantageous effects. The present disclosure provides a device for manufacturing a coated welding rod, including: a grabbing device 300, heating devices 400, and a flux storage device 500. The grabbing device 300 is configured to grab a single welding rod, each heating device 400 is located at the respective grabbing end of the grabbing device 300, and each heating device 400 is configured to heat the respective welding rod in the grabbing device 300. A flux in granular form is stored in the flux storage device 500, the grabbing device 300 is configured to transport the heated welding rod into the flux storage device 500, and the heated welding rod is configured to heat the flux surrounding the welding rod into a viscous glassy state so that the flux in the viscous glassy state adheres to the surface of the welding rod. The welding rod is heated by using the heating device 400, and the heated welding rod enables a granular flux to form a viscous glassy state, so that the flux can be adhered directly to the surface of the welding rod. The whole process is implemented without use of an organic binder such that environmental pollution can be reduced. Thus, the present disclosure can alleviate at least one of the technical problems existing during the manufacture of and welding with coated brazing materials in the prior art, in which toxic and hazardous gases polluting the environment are released from organic binders, and the organic binders are not completely decomposed during welding so that some organic residues remain in the welded joints, which will cause welding defects and affect the effectiveness and reliability of the welded joints and the service life of workpieces.

On the basis of the embodiment described above, optionally, the grabbing device 300 includes a driving mechanism 301, rotating mechanisms 302, and grabbing mechanisms 303. The driving mechanism 301 is in drive connection with the rotating mechanisms 302, the driving mechanism 301 is configured to drive the rotating mechanisms 302 to rotate, with the driving mechanism 301 being an axis of the rotation, each rotating mechanism 302 is connected with the respective grabbing mechanism 303 at its end away from the driving mechanism 301, and the grabbing mechanism 303 is configured to grab the welding rod.

Here, the driving mechanism 301 may be driven by a motor using a transmission shaft, wherein an output end of the motor is in drive connection with the rotating mechanisms 302 via the transmission shaft. When the motor is turned on, the rotating mechanisms 302 can be driven to rotate with the output end of the motor. Moreover, the grabbing mechanisms 303 are fixedly connected with the rotating mechanisms 302. When the rotating mechanisms 302 are rotating, each grabbing mechanisms 303 can grab and fix the initial welding rod 200 in one direction. Further, the grabbing mechanisms 303 can be moved along with the rotating mechanisms 302 to the position of the flux storage device 500. The heated initial welding rod 200 is gradually immersed into the granular flux during the rotation, whereby the grabbing and transport movement of the welding rod are completed.

Optionally, the device for manufacturing a coated welding rod further includes a first transport device 600 and a second transport device 700. The first transport device 600 and the second transport device 700 are arranged symmetrically with respect to the driving mechanism 301 in the horizontal direction, the flux storage device 500 is located below the driving mechanism 301, and the driving mechanism 301 is configured to drive the rotating mechanisms 302 to rotate in a direction from the first transport device 600 to the second transport device 700 so that the grabbing end of the grabbing mechanism 303 is immersed into the flux storage device 500.

Optionally, each rotating mechanism 302 includes rotating rods; one end of each rotating rod is drivingly connected with the driving mechanism 301, and the other end of the rotating rod is connected with the respective grabbing mechanism 303. Each rotating rod has a length equal to the distance between the respective driving mechanism 301 and the first transport device 600 and the rotating rod is configured to enable the driving mechanism 301 to grab an initial welding rod on the first transport device 600 by using the gasping mechanism 303.

Here, the first transport device 600 is configured to separately transport the initial welding rods 200 one by one. Since the rotating mechanisms 302 rotates around the driving mechanism 301, the first transport device 600 and the second transport device 700 are arranged symmetrically with respect to the driving mechanism 301 in the horizontal direction. Moreover, the distance between the first transport device 600 and the driving mechanism 301 is equal to the length of the rotating rod, whereby it can be ensured that one of the initial welding rods 200 on the first transport device 600 can be grabbed and fixed by the respective grabbing mechanism 303 located at the end of the rotating rod when the driving mechanism 301 drives the rotating rod to run to the position of the first transport device 600.

Optionally, the first transport device 600 and the second transport device 700 run at the same speed, and the driving mechanism 301 is configured to drive the rotating mechanisms 302 to rotate at a constant speed, so that every time the driving mechanism 301 drives the rotating mechanisms 302 to rotate and run to the first transport device 600, the initial welding rod 200 currently positioned at the end of the first transport device 600 can be grabbed and fixed. The above operation is cyclically repeated.

Optionally, a plurality of rotating rods are provided, wherein the plurality of rotating rods are arranged evenly along the circumferential direction of the driving mechanism 301, and each of the rotating rods is in drive connection with the driving mechanism 301.

Optionally, the number of the rotating rods may be two, four, six, or the like. Optionally, the number of the rotating rods is four, and the four rotating rods are arranged perpendicularly to each other. When the driving mechanism 301 drives the four rotating rods to rotate, the two rotating rods in the horizontal direction are respectively located at the outlet end of the first transport device 600 and the inlet end of the second transport device 700, and then the grabbing mechanisms 303 positioned at the two rotating rods are operated to grab an initial welding rod 200 and putting down a coated welding rod 100, respectively. At the same time, the grabbing mechanism 303 positioned at the vertical downward rotating rod immerses an initial welding rod 200 into the flux storage device 500. It should be noted that when the grabbing mechanism 303 located at the position of the first transport device 600 fixes an initial welding rod 200, the respective heating device 400 will be turned on to heat the initial welding rod 200. When the coated welding rod 100 is finished, the heating device 400 will stop heating, so that the flux in the glassy state is cooled down together with the welding rod. In this way, the manufacture of the coated welding rod 100 is completed.

Optionally, the first transport device 600 includes a first conveyor belt, and the second transport device 700 includes a second conveyor belt. A plurality of first placement parts configured to allow the initial welding rods 200 to be placed therein or thereon are arranged at equal intervals in or on the first conveyor belt, and a plurality of second placement parts configured to allow the coated welding rods 100 to be placed therein or thereon are arranged at equal intervals in or on the second conveyor belt.

Optionally, the first conveyor belt may be implemented as a gear belt or by belt transmission or the like, and the second conveyor belt may also be implemented as a gear belt or by belt transmission or the like. Details thereof will not be described here.

Optionally, the device for manufacturing a coated welding rod further includes a flux recovery mechanism 800. The flux recovery mechanism 800 is located below the second conveyor belt and is configured to recover the flux dropped from the coated welding rods 100.

Here, the flux recovery mechanism 800 is useful when there is the flux with low adhesion or there is unmelted and unadhered flux on the periphery of the coated welding rod 100. A flux recovery barrel or a flux recovery tank or the like may be used as the flux recovery mechanism 800, as long as it can be ensured that the flux recovery mechanism 800 can receive the dropped flux and has an opening at one end, into which the flux at the periphery of the coated welding rod 100 on the second transport device 700 can be dropped and recovered. Details thereof will not be described here.

Optionally, the device for manufacturing a coated welding rod further includes a vibrating mechanism 900. The vibrating mechanism 900 is located on the second conveyor belt, and the vibrating mechanism 900 is connected with the second conveyor belt. The vibrating mechanism 900 is configured to vibrate and clean the coated welding rods 100 placed on the second conveyor belt and is configured such that the flux which is not adhered to the coated welding rods 100 is vibrated down into the flux recovery mechanism 800.

Here, the vibrating mechanism 900 may be a vibrator, or may have a structure similar to a brush or the like to, for example, brush a coated welding rod 100 on the second transport device 700 back and forth, so that the flux with low adhesion or the unmelted and unadhered flux can fall off the periphery of the coated welding rod 100 under the action of the vibrator or the brush and then the flux is collected by the flux recovery mechanism 800. In this way, the reuse of the flux is achieved.

Optionally, each heating device 400 includes an electrode tip and a power source. The electrode tip is located in the respective grabbing mechanism 303, the electrode tip is electrically connected with the power source, and the power source is configured to power the heating of the electrode tip.

In this embodiment, the power source can energize the electrode tip. The electrode tip allows an electric current to pass through the welding rod and form a loop, so that the initial welding rod 200 produces heat by itself and heats up to 200° C. to 400° C. according to Joule's law.

Optionally, each grabbing mechanism 303 includes a first driving part 313, a second driving part 323, and a first curved segment 333 and a second curved segment 343 that are symmetrically arranged. The first curved segment 333 and the second curved segment 343 are hinged to the respective rotating mechanism 302, respectively, the first driving part 313 is in drive connection with the first curved segment 333, the second driving part 323 is in drive connection with the second curved segment 343, and the first driving part 313 and the second driving part 323 are configured to drive the first curved segment 333 and the second curved segment 343 to move in directions toward or away from each other so that the welding rod is grabbed in or released from a clamping channel formed between the first curved segment 333 and the second curved segment 343.

In this embodiment, the first curved segment 333 and the second curved segment 343 are hinged to the rotating mechanism 302, respectively. An initial welding rod 200 on the first transport device 600 can be clamped and fixed by the opening and closing of the first curved segment 333 and the second curved segment 343. In addition, a hydraulic cylinder or an air cylinder or the like may be used as each of the first driving part 313 and the second driving part 323. When a hydraulic cylinder is used, the fixed end of the hydraulic cylinder is fixedly connected with the rotating mechanism 302, and the extendable end of the hydraulic cylinder is hinged to the first curved segment 333 or the second curved segment 343. The opening and closing of the first curved segment 333 and the second curved segment 343 can be controlled by the extension or retraction of the hydraulic cylinders, so that a welding rod can be grabbed or released from the clamping channel formed between the first curved segment 333 and the second curved segment 343.

Figure 5:
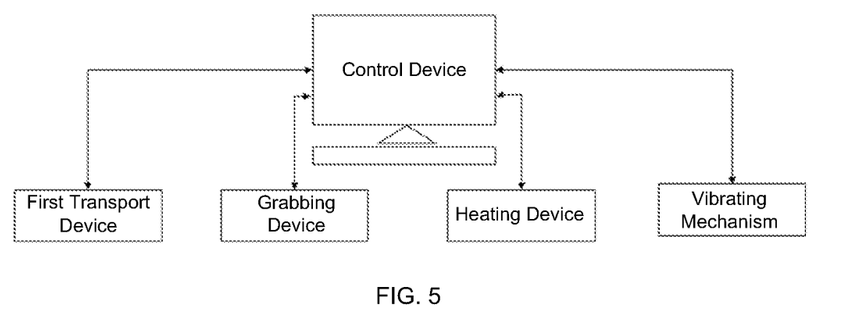
FIG. 5 is a control structure block diagram of a method for manufacturing a coated welding rod according to an embodiment of the present disclosure.

Optionally, the device for manufacturing a coated welding rod further includes a control device, temperature detection devices, a first speed detection device, a second speed detection device, and a third speed detection device. The control device is in signal connection with the temperature detection devices, the first speed detection device, the second speed detection device, and the third speed detection device, respectively. The temperature detection device is disposed on each heating device 400 and is configured to detect information on the temperature of the heating device 400 and transmit this temperature information to the control device. The control device in which a threshold range is preset correspondingly is configured to control the heating power of the heating device 400. The first speed detection device is configured to detect first transport speed information on the first transport device 600. The second speed detection device is configured to detect second transport speed information on the second transport device 700. The third speed detection device is configured to detect third rotation speed information on the rotating mechanism 302. The control device is configured to receive the first transport speed information, the second transport speed information, and the third rotation speed information, and correspondingly control the running speeds of the first transport device 600, the second transport device 700 and the driving mechanism 301 to match one another.

Optionally, the control device may be a computer control system, or an MCU (Microcontroller Unit) or a PLC (Programmable Logic Controller) or the like. The control device is configured to control the speed of the first transport device 600 and the speed of the driving mechanism 301, respectively, so that one of the initial welding rods 200 can be exactly grabbed and fixed by the grabbing end of the grabbing mechanism 303 when one of the rotating mechanisms 302 moves to the end of the first transport device 600, and further one of the initial welding rods 200 can be exactly grabbed and fixed by the grabbing end of the respective grabbing mechanism 303 when the next rotating mechanism 302 moves to the end of the first transport device 600. In this way, the grabbing mechanism 303 positioned at each of the rotating mechanisms 302 can be automatically controlled to grab and fix each of the initial welding rods 200 from the first transport device 600.

Optionally, the vibrating mechanism 900 and the second speed detection device are in electrical signal connection with the control device respectively, so that the vibration frequency or the like of the vibrating mechanism 900 can be controlled based on the running speed of the second transport device 700.

Optionally, the device for manufacturing a coated welding rod further includes angle detection devices. Each angle detection device is disposed on the respective rotating mechanism 302. Each angle detection device is configured to detect information on the rotation angle of the rotating mechanism 302 and transmit this angle information to the control device. The control device correspondingly controls ON or OFF of the respective heating device 400 based on the above rotation angle information and is configured to stop the heating of a welding rod to which the flux has already adhered.

In addition, the number of the rotating mechanisms 302 is preset, so that the rotation angle of each of the rotating mechanisms 302 can be obtained. When each grabbing mechanism 303 holds an initial welding rod 200, by an automatic control using varying angles, the heating device 400 can be controlled to turned on to heat the respective initial welding rod 200, and when the grabbing mechanism 303 is moved out of the flux storage device 500, the heating device 400 is controlled to be turned off such that enter a cooled state.

Optionally, a temperature detection device may also be disposed on each heating device 400, so that the information on the temperature of the heating device 400 can be monitored in real time, whereby the temperature of heating by the heating device 400 can be controlled.

In this embodiment, temperature sensors may be used as the temperature detection devices, and speed sensors may be used as the first speed detection device, the second speed detection device, and the third speed detection device.

As shown in FIGS. 1 to 5, the present disclosure provides a method for manufacturing a coated welding rod, including the steps of: producing an initial welding rod 200 as a brazing material; heating the initial welding rod 200, and heating a granular flux to coat the surface of the initial welding rod 200 with the granular flux; and finishing a coated welding rod 100.

Figure 4:
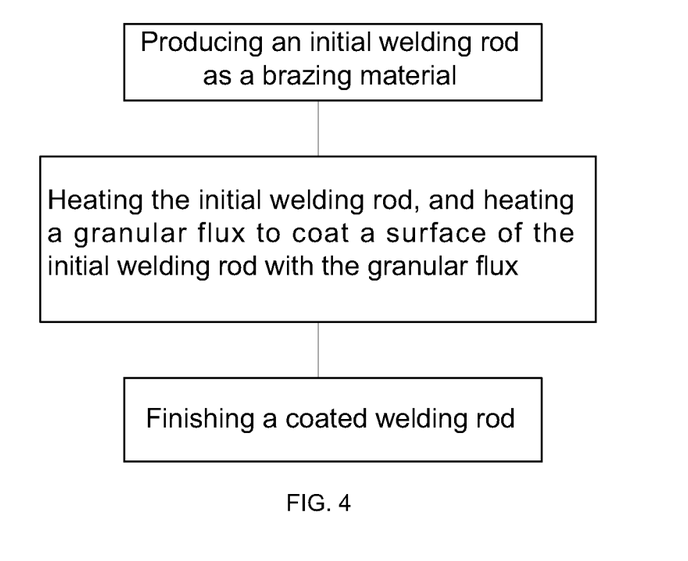
FIG. 4 is a flow chart of a method for manufacturing a coated welding rod according to an embodiment of the present disclosure.

Optionally, the step of producing an initial welding rod 200 as a brazing material further includes the steps of: casting an ingot from raw materials with prepared compositions; heating the ingot and then extruding the ingot into a wire; drawing the extruded wire to have a target diameter;

straightening the welding rod that reaches the target diameter; and cutting the straightened welding rod at a preset size to finish the initial welding rod 200.

Here, raw materials with prepared compositions are placed in a smelting furnace to be smelted and cast into an ingot. The ingot is heated and then placed in an extruder and extruded into a wire. The extruded wire is drawn multiple times to have a target diameter as required. The welding wire having the target diameter is straightened by a straightening apparatus and then may be cut as required.

Optionally, the step of heating the initial welding rod 200 further includes the steps of: placing onto the first transport device 600 the initial welding rods which are already cut into a fixed length and sorting them so that they are arranged individually at equal intervals; grabbing devices 300 sequentially grabbing and fixing the individual initial welding rods 200 from the first transport device 600; and heating the initial welding rod 200 fixed in the respective grabbing device 300; wherein the welding rod is heated at a temperature ranging from 200° C. to 400° C.

Here, the initial welding rods 200 are placed on an individual rod queuing machine and sorted into individual rods, and then the individual initial welding rods 200 are arranged on the conveyor belt; or spaced grooves may be provided on the conveyor belt, and the initial welding rods 200 may be manually placed one by one into the grooves spaced at equal intervals respectively.

It should be noted that activation temperatures of different fluxes are generally between 650° C. and 1000° C., therefore the initial welding rod 200 heated to 200° C. to 400° C. causes only a physical change to the flux so that the flux is turned into a viscous glassy state, while the high-temperature activity of the flux will not be affected.

Optionally, the step of heating a granular flux to coat the surface of the initial welding rod 200 with the granular flux further includes the steps of: grinding a flux which is mixed according to a specified formula into granular form; placing the granular flux in the flux storage device 500 and placing the flux storage device 500 below the grabbing device 300; the grabbing device 300 to driving the heated initial welding rod 200 to rotate into the flux storage device 500; wherein the outer surface of the heated initial welding rod 200 is surrounded by the granular flux, and the flux surrounding the welding rod is melted into a viscous glassy state and adheres to the surface of the welding rod so that a coated welding rod 100 is formed.

Optionally, the method for manufacturing a coated welding rod further includes the steps of: the grabbing device 300 driving the coated welding rod 100 to which the flux is already adhered to rotate out of the flux storage device 500; and stopping heating the coated welding rod 100 to which the flux is already adhered, wherein the flux in the glassy state is cooled down together with the coated welding rod 100.

Optionally, the method for manufacturing a coated welding rod further includes the steps of: the grabbing device 300 driving the cooled coated welding rod 100 to rotate onto the second transport device 700; and the vibrating mechanism 900 on the second transport device 700 vibrating the flux with low adhesion or the unmelted and unadhered flux off the periphery of the coated welding rod 100 into the flux recovery mechanism 800.

Optionally, the method for manufacturing a coated welding rod further includes the steps of: detecting the coated welding rods 100 which are already subjected to vibrations; and collecting and packaging the coated welding rods 100 which are already detected.

Optionally, the method for manufacturing a coated welding rod further includes the steps of: a control device correspondingly controlling a transport speed of the first transport device 600, a transport speed of the second transport device 700, and a rotation speed of each grabbing device 300 to make them matched with one another, with the control device in electrical signal connection with each of the first transport device 600, the second transport device 700, the grabbing devices 300 and the heating devices 400; and the control device correspondingly controlling a rotation angle of each grabbing device 300 to match an interval between ON and OFF of the respective heating device 400.

In this embodiment, a new method for quick on-line manufacture of coated welding rods 100 without the use of a binder is implemented during the production of the coated welding rods 100, which includes: casting of a brazing material→extrusion→drawing→cutting→resistance heating→adhesion of a flux→packaging. The method for manufacturing coated welding rods 100 according to this embodiment involves a simple process, allows rapid manufacture, and is environmentally friendly. A rapid online production is achieved without addition of an organic binder adhering the flux onto the periphery of welding rods for brazing, which is required in the conventional production of coated welding rods for brazing. Thus, the production procedures are greatly reduced, and environmental-friendly production and manufacture are achieved. Also, this method can avoid organic matters from polluting the surrounding ecological environment, water and atmosphere and endangering of the health of operators due to the excessive use of organic binders during the production and use.

The present disclosure brings about at least the following advantageous effects. The present disclosure provides a method for manufacturing a coated welding rod. The whole process is implemented without the use of organic binder, thus pollutions to environment are greatly reduced, and the coated welding rod so manufactured is a veritable environmental-friendly product. The heating device 400 is energized so that an initial welding rod 200 heats up rapidly and reaches a state that enables a flux to be melted into a viscous glassy state. The flux in the viscous glassy state rapidly adheres to the surface of the brazing material, and the coating is completed with the welding rod being no longer energized and cooled down. The vibrating mechanism 900 allows the flux with low adhesion or the unmelted and unadhered flux to fall off the periphery of the welding rod into the flux recovery barrel to be recovered for reuse. The whole process may be controlled by a control device such as a computer system, which may control the optimal heating temperatures for different fluxes and control the key process parameters such as the optimal heating current and time, the temperature of the welding rod, and the forward speed of the initial welding rod 200, the dwell time of the heated initial welding rod 200 in the flux storage device 500, and the vibration intensity of the vibrating mechanism 900 for brazing materials with different diameters and compositions. Thus, coated brazing and welding rods of different sizes can be produced to meet the requirements of different clients and different equipment. This method is significantly effective in energy conservation and environmental protection, efficiency enhancement, quality improvement, and cost reduction.

The above description is merely illustrative of optional embodiments of the present disclosure and is not intended to limit the present disclosure. It will be understood by those skilled in the art that various modifications and variations can be made to the present disclosure. Any modifications, equivalent alternatives, improvements and so on made within the spirit and principle of the present disclosure are to be included in the scope of protection of the present disclosure.

INDUSTRIAL APPLICABILITY

In a device and method for manufacturing a coated welding rod according to the embodiments of the present disclosure, the whole process is implemented without the use of organic binder, thus pollutions to the environment are reduced, and the effectiveness, reliability, and service life of welded joints can be ensured.

What is claimed is:

1. A device for manufacturing a coated welding rod, comprising:
    a grabbing device, heating devices, and a flux storage device,
    wherein the grabbing device is configured to grab a single welding rod each time, each heating device is located at a grabbing end of the grabbing device, and each heating device is configured to heat the single welding rod in the grabbing device;
    a flux in granular form is stored in the flux storage device, the grabbing device is configured to transport the heated single welding rod into the flux storage device, and the heated single welding rod is configured such that a flux surrounding the welding rod is heated to become a viscous glassy state, so that the flux in the viscous glassy state adheres to a surface of the single welding rod,
    wherein the grabbing device comprises a driving mechanism, rotating mechanisms, and grabbing mechanisms; and
    the driving mechanism is in drive connection with the rotating mechanisms, the driving mechanism is configured to drive the rotating mechanisms to rotate, with the driving mechanism being a center of the rotation, each rotating mechanism is connected with the respective grabbing mechanism at an end of the rotating mechanism away from the driving mechanism, and each grabbing mechanism is configured to grab the respective welding rod,
    wherein each heating device comprises an electrode tip and a power source; and
    the electrode tip is located in each of the grabbing mechanisms, and the electrode tip is electrically connected with the power source, wherein the power source is configured to power the heating of the electrode tip.

2. The device for manufacturing a coated welding rod according to claim 1, further comprising a first transport device and a second transport device,
    wherein the first transport device and the second transport device are arranged symmetrically with respect to the driving mechanism in a horizontal direction, the flux storage device is located below the driving mechanism, and the driving mechanism is configured to drive the plurality of rotating mechanisms to rotate in a direction from the first transport device to the second transport device so that the grabbing end of the grabbing mechanism is immersed into the flux storage device.

3. The device for manufacturing a coated welding rod according to claim 2, wherein each rotating mechanism comprises a rotating rod;
    one end of the rotating rod is in drive connection with the driving mechanism, the other end of the rotating rod is connected with the respective grabbing mechanism, and the rotating rod has a length equal to a distance between the driving mechanism and the first transport device and is configured to enable the driving mechanism to grab an initial welding rod on the first transport device by using the grabbing mechanism.

4. The device for manufacturing a coated welding rod according to claim 3, wherein a plurality of rotating rods are provided for each rotating mechanism, the plurality of rotating rods are arranged evenly along a circumferential direction of the driving mechanism, and each of the rotating rods is in drive connection with the driving mechanism.

5. The device for manufacturing a coated welding rod according to claim 2, wherein the first transport device comprises a first conveyor belt, and the second transport device comprises a second conveyor belt;
    a plurality of first placement parts configured to allow initial welding rods to be placed therein or thereon are arranged at equal intervals in or on the first conveyor belt, and a plurality of second placement parts configured to allow the coated welding rods to be placed therein or thereon are arranged at equal intervals in or on the second conveyor belt.

6. The device for manufacturing a coated welding rod according to claim 5, further comprising a flux recovery mechanism,
    wherein the flux recovery mechanism is located below the second conveyor belt and is configured to recover the flux dropped from the coated welding rod.

7. The device for manufacturing a coated welding rod according to claim 6, further comprising a vibrating mechanism,
    wherein the vibrating mechanism is located on the second conveyor belt, the vibrating mechanism is connected with the second conveyor belt, and the vibrating mechanism is configured to clean a coated welding rod placed on the second conveyor belt by vibration and is configured such that the flux which is not adhered to the coated welding rod is vibrated down into the flux recovery mechanism.

8. The device for manufacturing a coated welding rod according to claim 2, further comprising a control device, temperature detection devices, a first speed detection device, a second speed detection device, and a third speed detection device,
    wherein the control device is in electrical signal connection with the temperature detection devices, the first speed detection device, the second speed detection device, and the third speed detection device respectively, each temperature detection device is disposed on the respective heating device and is configured to detect information on a temperature of the heating device and transmit this temperature information to the control device, and the control device in which a threshold range is preset is configured to correspondingly control a power of the heating by the heating device;
    the first speed detection device is configured to detect first transport speed information on the first transport device, the second speed detection device is configured to detect second transport speed information on the second transport device, the third speed detection device is configured to detect third rotation speed information on the rotating mechanism, and the control device is configured to receive the first transport speed information, the second transport speed information, and the third rotation speed information and correspondingly control the running speeds of the first transport device, the second transport device and the driving mechanism to be matched with one another.

9. The device for manufacturing a coated welding rod according to claim 8, further comprising a plurality of angle detection devices,
wherein each angle detection device is disposed on the respective rotating mechanism, the angle detection device is configured to detect rotation angle information on the rotating mechanism and transmit this angle information to the control device, and the control device is configured to correspondingly control ON or OFF of the respective heating device based on the rotation angle information and is configured to stop the heating of the welding rod to which the flux is already adhered.

10. The device for manufacturing a coated welding rod according to claim 1, wherein each grabbing mechanism comprises a first driving part and a second driving part, and also comprises a first curved segment and a second curved segment which are arranged symmetrically; and
the first curved segment and the second curved segment are hinged to the rotating mechanism respectively, the first driving part is in drive connection with the first curved segment, the second driving part is in drive connection with the second curved segment, and the first driving part and the second driving part are configured to respectively drive the first curved segment and the second curved segment to move in a direction toward or away from each other so that the welding rod is grabbed in or released from a clamping channel formed between the first curved segment and the second curved segment.

11. A method for manufacturing a coated welding rod according to claim 1, comprising steps of:
producing an initial welding rod as a brazing material;
heating the initial welding rod, and heating a granular flux to coat a surface of the initial welding rod with the granular flux; and
finishing a coated welding rod.

12. The method for manufacturing a coated welding rod according to claim 11, wherein the step of producing an initial welding rod as a brazing material further comprises steps of:
casting an ingot using raw materials with prepared compositions;
heating the ingot and then extruding the ingot into a wire;
drawing the extruded wire to have a target diameter;
straightening the welding rod that has reached the target diameter; and
cutting the straightened welding rod at a preset size to finish the initial welding rods.

13. The method for manufacturing a coated welding rod according to claim 12, wherein the step of heating the initial welding rod further comprises steps of:
placing onto a first transport device the initial welding rods which are cut into a fixed length and sorting them so that they are arranged individually at equal intervals;
a grabbing device sequentially grabbing and fixing each individual initial welding rod from the first transport device; and
heating the initial welding rod fixed in the grabbing device,
wherein the initial welding rod is heated at a temperature ranging from 200° C. to 400° C.

14. The method for manufacturing a coated welding rod according to claim 13, wherein the step of heating a granular flux to coat a surface of the initial welding rod with the granular flux further comprises steps of:
grinding a flux which is mixed according to a specified formula, into granular form to produce a granular flux;
placing the granular flux in a flux storage device and placing the flux storage device below the grabbing device;
the grabbing device driving the heated initial welding rod to rotate so that the heated initial welding rod is moved into the flux storage device,
wherein the outer surface of the heated initial welding rod is surrounded by the granular flux, and the flux surrounding the welding rod is melted into a viscous glassy state and adheres to the surface of the welding rod so that a coated welding rod is formed.

15. The method for manufacturing a coated welding rod according to claim 11, further comprising steps of:
grabbing device driving the coated welding rod to which the flux is already adhered to rotate so that the coated welding rod is moved out of the flux storage device; and
stopping heating the coated welding rod to which the flux is already adhered, wherein the flux in the glassy state is cooled down together with the coated welding rod.

16. The method for manufacturing a coated welding rod according to claim 15, further comprising steps of:
the grabbing device driving the cooled coated welding rod to rotate onto a second transport device; and
a vibrating mechanism on the second transport device vibrating the flux with low adhesion or the unmelted and unadhered flux, which is then made to be off the periphery of the coated welding rod and reach a flux recovery mechanism.

17. The method for manufacturing a coated welding rod according to claim 16, further comprising steps of:
detecting the coated welding rods which are already subjected to vibrations; and
collecting and packaging the coated welding rods which are already detected.

18. The method for manufacturing a coated welding rod according to claim 11, further comprising steps of:
using a control device to correspondingly control a transport speed of the first transport device, a transport speed of the second transport device, and a rotation speed of the grabbing device, to make them matched with one another, with the control device in electrical signal connection with each of the first transport device, the second transport device, the grabbing device and the heating devices; and
using the control device to correspondingly control a rotation angle of the grabbing device to make the rotation angle matched with an interval between ON and OFF of the heating devices.

* * * * *